Feb. 21, 1961  B. O. SANFORD  2,972,426
BOAT TRAILER
Filed June 11, 1957
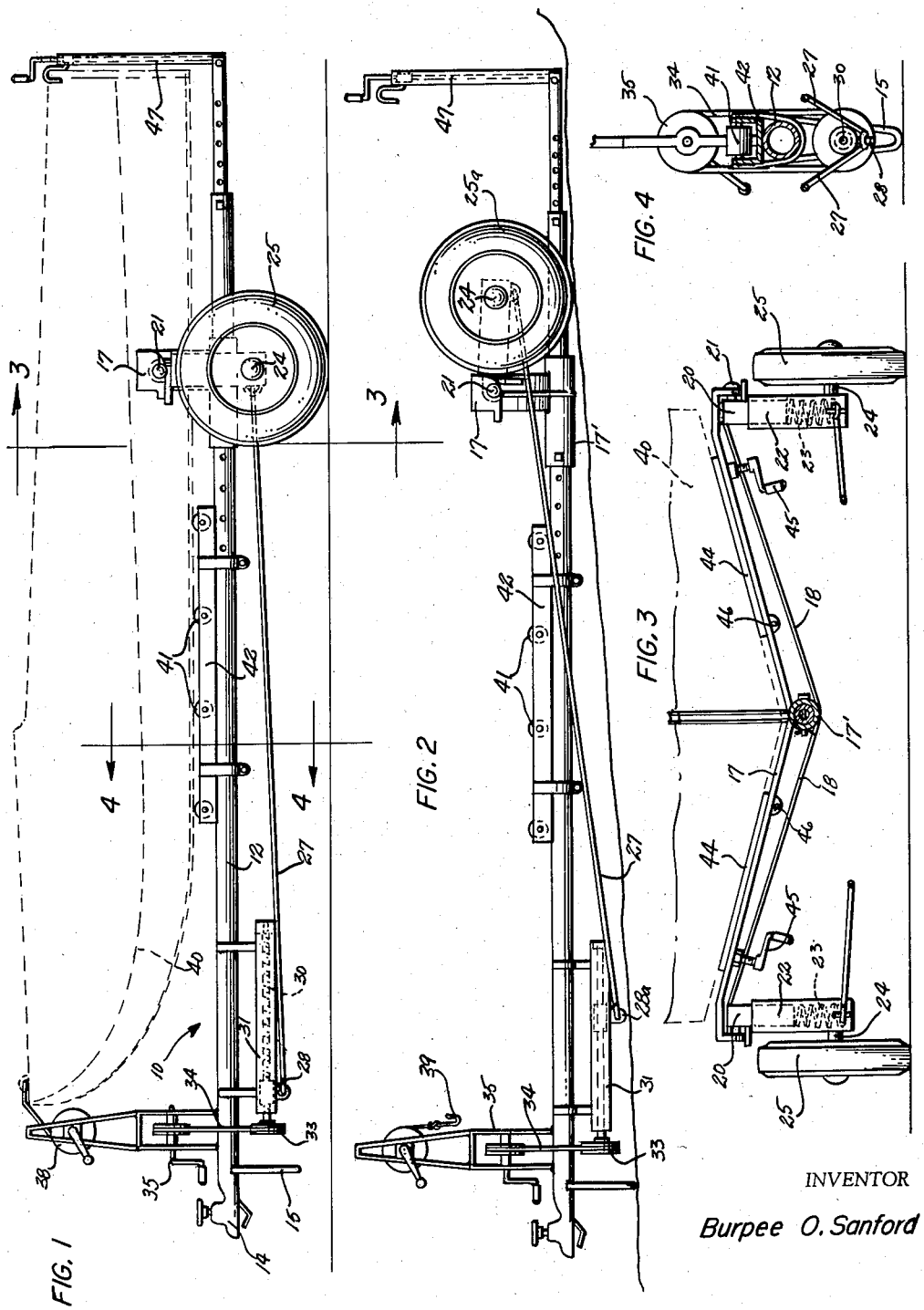
INVENTOR
Burpee O. Sanford

2,972,426
Patented Feb. 21, 1961

2,972,426
BOAT TRAILER
Burpee O. Sanford, 320 West St., Braintree 84, Mass.
Filed June 11, 1957, Ser. No. 664,961
1 Claim. (Cl. 214—505)

This invention relates to trailers and more particularly to a self loading trailer for boats.

It is an object of the present invention to provide a self loading and transport trailer for boats having winch means for automatically loading a boat thereon in a simple and efficient manner.

Another object of the present invention is to provide a self loading and transport trailer for boats of the above type wherein the rear end of the trailer is supported upon a pair of wheels that are pivotally connected to a V-shaped axle, whereby the winch is operative to effect pivotal movement of the wheels about the axle so as to raise and lower the trailer during the loading operation.

Other objects of the invention are to provide a boat trailer bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Fig. 1 is a side elevation with the boat trailer in carrying position.

Fig. 2 is a similar view with the boat trailer in loading or unloading position.

Fig. 3 is a section on line 3—3 of Fig. 1.

Fig. 4 is a section on line 4—4 of Fig. 4.

Referring now more in detail to the drawing, a boat trailer 10 made in accordance with the present invention is shown to include a longitudinally extending boom or draw bar 12 having a trailer hitch 14 and ground support 15 at one end thereof. The opposite rear end of the boom 12 is secured to the apex of a V-shaped axle or cross support by means of a sleeve 17' that is adjustable upon the boom 12 and is reinforced by a pair of parallel truss rods 18 extending between the sleeve 17' and the elevated ends of the support 17.

Each end of the axle for cross support 17 is provided with a spring biasing wheel support column 20 that is pivotally mounted thereupon by means of pivot pins 21. Each column 20 extends into a tubular sleeve 22 and is supported upon a compression spring 23 contained therein. A stub axle 24 secured to each sleeve 22 rotatably supports a wheel 25. As is more clearly shown in Figures 1 and 2, a pair of rearwardly diverging radius rods 27 are connected at their rear ends to the respective sleeves 22 and at their forward ends to a threaded bracket 28. A threaded screw 30 is in threaded engagement with the bracket 28 so as to effect longitudinal movement thereof in response to the rotation of the screw 30 by an integrally connected pulley 33. A belt 34 connects the pulley 33 to a similar pulley associated with a manually operated winch 35. Thus, by rotating the winch 35, the radius rods 27 are reciprocated longitudinally of the trailer to effect rotation of the wheels 25 with the sleeves 22 around the pivotal connection 21 with the V-shaped axle 17. In order to place the trailer in a boat loading or boat unloading position, the winch 35 is operated so as to move the radius rods 27 rearwardly to effect rotation of the wheel assembly to a raised position 25a, in which position the rear end of the trailer rests upon the ground. The boat 40 may then be readily loaded or unloaded relative to the trailer in this position. To load the boat 40, the hook 39 of a second winch 38 is engaged with the front end of the boat and upon actuating the winch 38, the boat may then be drawn from the rear extremity of the trailer forwardly to the dotted line position shown in Figure 1. This movement is facilitated by means of rollers 41 rotatably supported upon a housing 42 carried at the longitudinal center of the boom 12. Cradles 44 that are adjustably operated by means of hand cranks 45, are pivotally supported upon the V-shaped axle 17 by means of rotatable pivots 46, whereupon they may be rotated into flat faced engagement with the bottom of the boat so as to prevent rocking thereof during transit. The rear extremity of the trailer is also provided with a transom sock 47 which is brought into securing engagement with the stern of the boat so as to prevent longitudinal movement thereof during transit. After the boat is in the position shown in Figure 1, the cradles 44 are properly positioned and transom sock engaged with the boat. By then operating the winch 35, the screw 30 is operative to draw the bracket 28a forwardly to the transit position 28, which also draws the radius rods 27 forwardly together with the upwardly disposed wheel assemblies 45a so as to bring the axle support columns 20 to the vertical position, at which point the rear end of the trailer will be raised above the ground in a normal transport position.

In order to unload the trailer, the above outlined procedure is reversed, the winch 35 being operated to permit the wheel support columns to rotate rearwardly and upwardly and thus allowing the rear end of the trailer to settle downwardly toward the ground. The boat may then be pulled rearwardly along the rollers 41.

While various changes may be made in the detail construction, it shall be understood that such changes shall be within the spirit and scope of the present invention as defined by the appended claim.

What I claim as new and desire to protect by Letters Patent of the United States is:

A self-loading transport trailer for boats comprising a longitudinal tubular boom having a trailer hitch secured to one end thereof, a transversely extending V-shaped cross support having a sleeve at the apex thereof adapted to adjustably slide and engage along the boom, said cross support having its ends elevated upwardly from the sleeve, a pair of diverging truss rods extending from the sleeve to the elevated end of the cross support, a spring biased support column pivotally mounted upon and depending from each of the elevated ends of said V-shaped cross support, each of said columns having an axle at the lower end thereof, wheels journalled upon said axles, winch means carried on the forward end of said boom, a pair of radius rods connected to the axle ends of said columns and connected to said winch, means operative to adjust the effective length of said radius rods such that said columns may be selectively positioned in a vertical plane formed by said V-shaped cross support thereby raising said tubular boom for support by said columns and journalled wheels.

References Cited in the file of this patent
UNITED STATES PATENTS

| | | |
|---|---|---|
| 2,497,072 | Copper | Feb. 14, 1950 |
| 2,704,021 | Brundage | Mar. 15, 1955 |
| 2,720,413 | Halverson | Oct. 11, 1955 |
| 2,740,639 | Eckroad | Apr. 3, 1956 |
| 2,788,908 | Lynd | Apr. 16, 1957 |